Jan. 30, 1962
C. O. LONG
3,018,588
WHEEL TRUING DEVICE
Filed Feb. 15, 1960
2 Sheets-Sheet 1
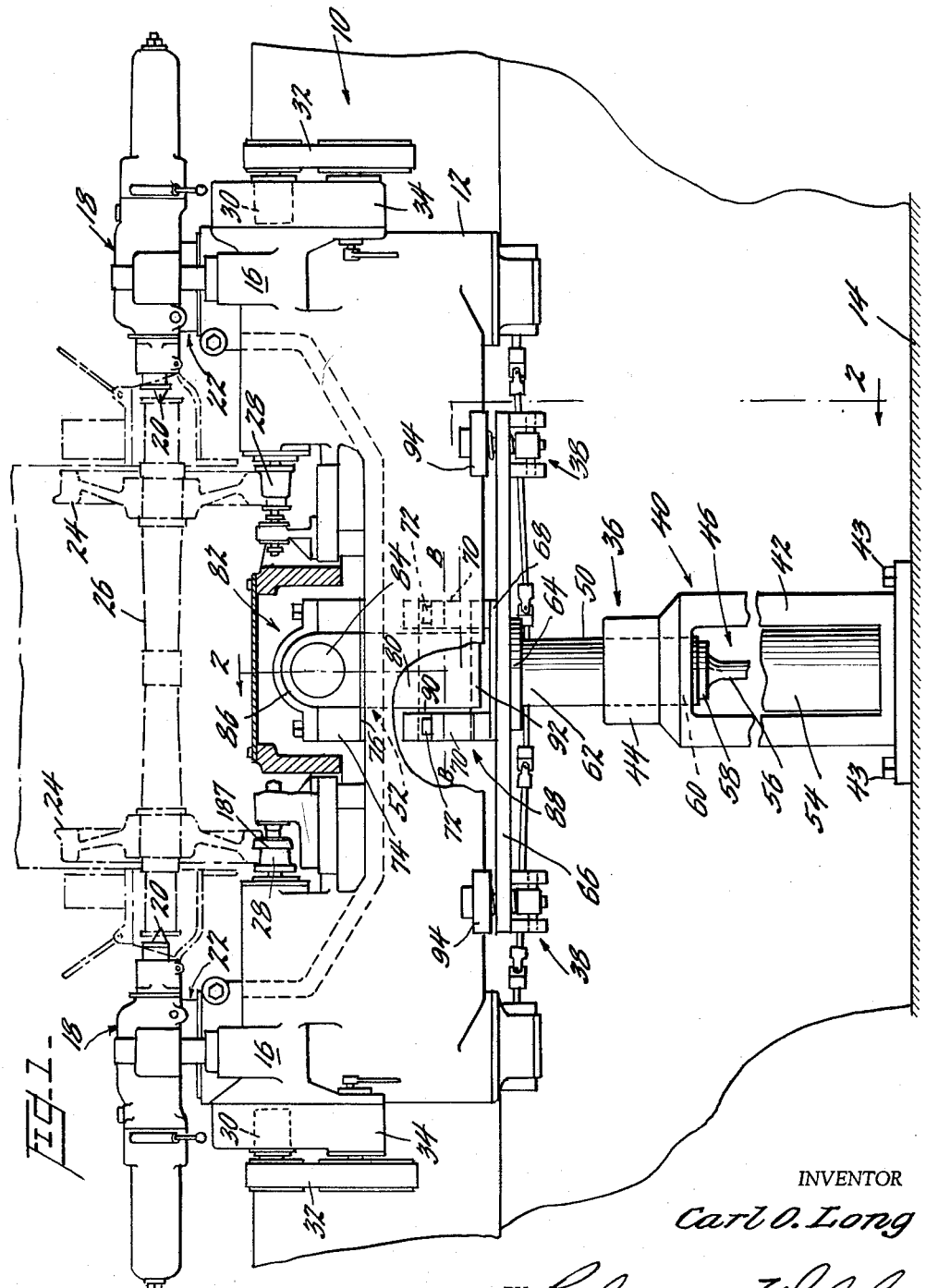
INVENTOR
Carl O. Long
BY Parker and Walch
ATTORNEYS Jan. 30, 1962    C. O. LONG    3,018,588
WHEEL TRUING DEVICE
Filed Feb. 15, 1960    2 Sheets-Sheet 2
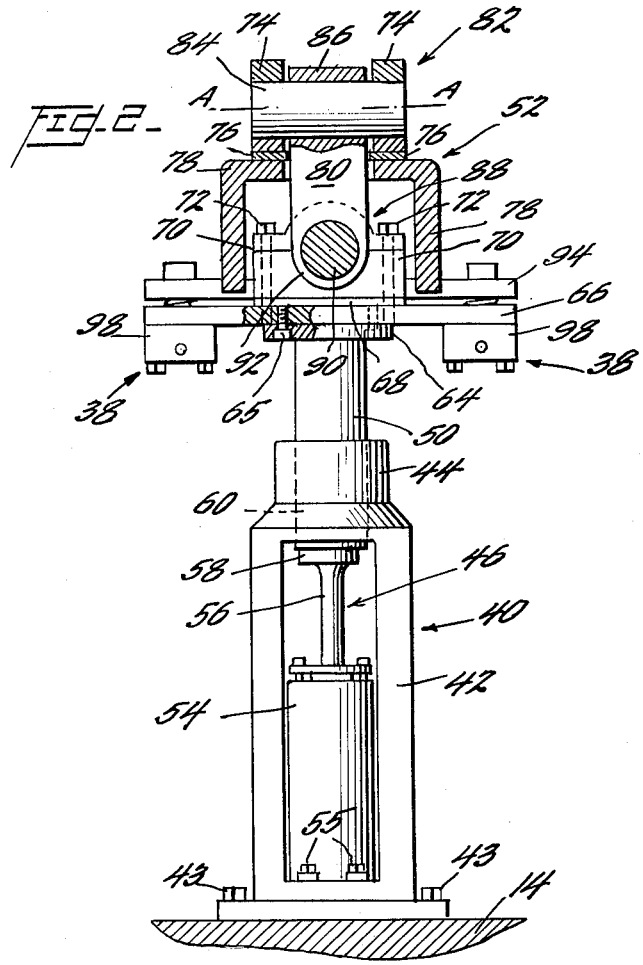
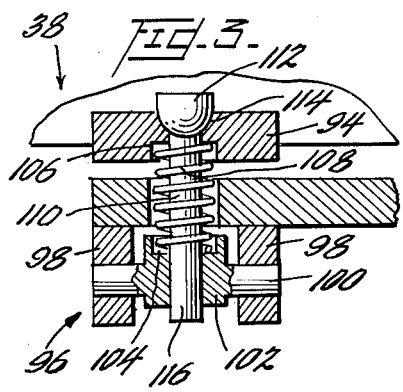
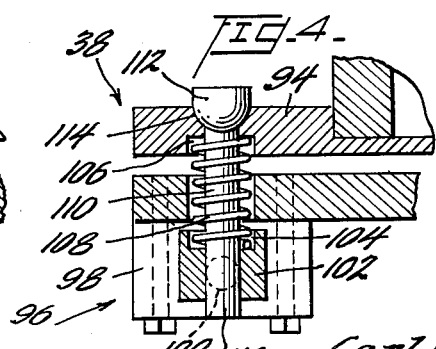
INVENTOR
Carl O. Long
BY Parker and Walsh
ATTORNEYS

United States Patent Office 3,018,588
Patented Jan. 30, 1962

3,018,588
WHEEL TRUING DEVICE
Carl O. Long, 521 E. Williams St., Barstow, Calif., assignor of one-half to Raymond A. Walsh, Washington, D.C.
Filed Feb. 15, 1960, Ser. No. 8,610
14 Claims. (Cl. 51—104)

This invention relates to wheel truing machines and more particularly to an improved supporting arrangement for supporting a truing machine for use in truing or refinishing wheels of railroad equipment such as locomotives, cars and other rolling stock.

In normal use, the wheels of railroad equipment often develop flat spots on the wheel tread, or sometimes the wheels become oval in configuration. This condition may be caused by the spalling of the tread surface due to alternate heating and cooling as a result of braking the wheels. Sometimes cars are stopped suddenly by locking the wheels. This results in the wheels skidding along the rails thereby wearing away rapidly an area of the tread surface. Often an emergency stop develops flat spots on several of the wheels of a car.

Flat spots on railroad car wheels render the car unfit for further service. Before the car can be put back into normal operation it is necessary that the car be supplied with wheels which are true, i.e., wheels which have tread surfaces that are circular in configuration.

In the past, it has been one practice, once a railroad car developed wheels with flat spots, to return the car immediately to the railroad yard, remove from the car all the defective wheels, and then supply the car with new or refinished wheels. This practice, of course, ties up a car for a lengthy period while the faulty wheels are replaced, and in addition requires that a large supply of wheels be kept on hand at all times.

Another practice has been to use a wheel truing machine which does not require that the wheels be removed from the car. The wheel truing machine is located in a pit beneath a railroad track. The car is moved over the pit so that a pair of wheels comes to rest directly over the truing machine which, in its inoperative position, is near the bottom of the pit. Supporting rollers are moved into position beneath the car wheels, and the track portion adjacent the truing machine is withdrawn so that the weight of the wheel and axle assembly is borne by the supporting rollers. Next the truing machine mechanism is raised from the bottom of the pit into position to engage the wheels. Revolving cutting tools contact the wheel tread surfaces, and as the supporting rollers rotate slowly so as to rotate the wheels, the cutting tools refinish the tread surface into the desired circular configuration.

This type of wheel truing machine serves as a practical and effective device for truing defective railroad car wheels and is disclosed in detail in U.S. Letters Patent No. 2,622,374, issued December 23, 1952, for Wheel Truing Device. Although the machine described in the above identified Patent No. 2,622,374 has many advantages, and overcomes the undesirable aspects encountered in previous practices for refinishing defective wheels, and moreover enables the entire cutting operation to be accomplished in a relatively short time, it has certain objectionable features, viz, the truing machine mechanism is subject to jerking motions caused by the irregular tread surface encountered by the cutting tools. If relatively large cuts are taken, the cutter tends to ride up on the wheel producing further irregularities in the surface being worked. Such undesirable features result from an ineffective supporting arrangement for the truing mechanism.

Accordingly it is one object of this invention to provide a satisfactory supporting arrangement for a wheel truing machine of the type described.

Another object of this invention is to provide a supporting arrangement which gives stability to a wheel truing machine, and yet which allows the machine to be moved freely.

Another object is to provide an improved arrangement for raising and lowering a wheel truing machine.

Another object is to provide a supporting structure of improved stability, permitting heavy cuts to be taken during the wheel truing operation, even when one of a pair of wheels requires a heavier cut than the other.

These objects are accomplished according to one preferred embodiment of this invention by providing a supporting arrangement which is directly beneath the wheel truing mechanism, which supporting arrangement includes an extendable-retractable piston-cylinder type jack device and a stabilizing assembly interposed between the supporting arrangement and the wheel truing mechanism. The cylinder of the jack device is ground supported and anchored firmly to the floor of a pit, and the piston extends upwardly from the cylinder wherein connection is made with its upper end portion to a U-shaped frame structure of the truing mechanism. Two horizontally positioned pivot pins in the connection allow the U-shaped frame structure to swing or pivot freely in a longitudinal and transverse direction about axes which extend substantially normal to each other. A stabilizing assembly includes a rectangular, horizontally disposed plate connected to the piston rod and resilient spring devices are positioned at the corners of the plate in contact with the bottom side of the U-shaped frame structure. The spring devices serve to equalize the forces in the U-shaped frame structure, the lower supporting arrangement and the wheel supporting and driving structure, overcoming irregularities caused by one wheel of a pair requiring a more substantial cut for effective truing. Utilizing the aforementioned patented apparatus, it has been particularly observed that it is inadvisable, where a markedly heavier total cut is to be taken on one wheel, it is necessary for this operation to be accomplished by several successive cuts. My invention aims to overcome this.

Other objects and important features of the invention will be apparent from a study of the specification following, taken with the drawing, which together show and describe a preferred embodiment of the invention and what is now considered to be the best mode of practicing the principles thereof. Other embodiments may be suggested to those having the benefit of the teachings herein, and such other embodiments are intended to be reserved especially as they fall within the scope and spirit of the subjoined claims.

In the drawing:

FIGURE 1 is an end elevational view through a pit in which a wheel truing machine is positioned showing the supporting assembly of this invention supporting a wheel truing mechanism in position to refinish tread surfaces of metallic car wheels which are illustrated in dot-dash lines;

FIGURE 2 is a partial side elevational view, in which certain elements are shown in cross section, of the supporting assembly illustrated in FIGURE 1 taken along the line 2—2 looking in the direction of the arrows;

FIGURE 3 is an enlarged end elevational view of a resilient stabilizing device of the supporting assembly showing certain elements in cross section; and FIGURE 4 is an enlarged side elevational view of the device illustrated in FIGURE 3.

Attention is now directed to the drawing wherein a wheel truing mechanism 10, similar to the mechanism shown in the above identified U.S. Patent No. 2,622,374, is illustrated and reference may be made to the above identified patent for a more detailed description of such mechanism and the operation thereof. The wheel truing mechanism 10 includes a U-shaped frame structure 12 which is usually located in a pit 14 that may be constructed beneath a section of a railroad track in a railroad yard or shop. The frame structure 12 is provided with longitudinally spaced upstanding leg portions 16 and as shown in FIG. 1 the frame structure 12 is provided with and contains certain identical mechanisms, now briefly to be described, such as a centering device 18 located adjacent the top of each of the leg portions 16 of the U-shaped frame structure 12. The centering devices 18 each have a longitudinally inwardly directed projection 20 which may be moved generally horizontally in and out relative to the respective centering device 18. Posts 22 are provided for movably connecting each of the centering devices 18 to the respective upstanding leg portion 16 of the U-shaped frame structure 12 and by means of devices, not illustrated, which are enclosed within the U-shaped frame structure 12 the centering devices 18 may also be adjusted generally vertically relative to the U-shaped frame structure 12.

When the wheel truing mechanism 10 is in the desired operative position, the centering devices 18 are each adjacent a metallic wheel 24 of a railroad car or the like which is to have a tread surface refinished. The projections 20 may be adjusted inwardly to securely engage the center of an axle 26 on which the wheels 24 are mounted.

Drive rolls 187, one of which is shown at the left in FIGURE 1, are located beneath each of the wheels 24 and slightly in advance thereof as the car moves into the apparatus. They may be lowered to permit the car to enter the apparatus on rails, not shown, and raised to drive the wheels 24 by flange contact. Two additional rollers may be inserted from the sides, behind wheels 24 to block reverse movement of the car. These are not shown in FIGURE 1, being located directly behind drive rollers 187 and cutting tools 28.

Cutting tools 28 are independently supported between the respective drive and blocking rolls, directly beneath the wheels 24, for movement toward the face of the wheel to be trued. The contour of the cutting edges of the tools is designed to restore the proper car wheel contour. Motors 30 mounted on each of the respective upstanding leg portions 16 of the U-shaped frame structure 12, through belt and pulley arrangements 32 drive the cutting tools 28 through gear boxes 34 and drive shafts, not illustrated, located within the U-shaped frame structure.

In the operation of both the patented device and my modification of it, the car is moved onto the device until the wheels 24 are in approximately correct location, the rollers 187 in full raised position acting as forward stops. The blocking rollers are then placed behind the wheels and the drive rollers are shifted to lift the car wheels from the rails. This permits withdrawal of the rail section immediately below the wheels during the truing operation.

The wheel truing mechanism 10 thus far described is supported by means in the form of a supporting structure or assembly 36 which will be described in detail hereinafter. The supporting structure or assembly 36 serves to raise the mechanism 10 from the pit into operative position wherein the cutter tools engage the respective tread surfaces of the wheels 24, and also serves to lower the wheel truing mechanism 10 into the pit after such cutting-truing operation has been completed. In addition, the herein disclosed supporting assembly 36 steadies the wheel truing mechanism 10 during the cutting-truing operation and means 38, to be described in more detail hereinafter are provided to take up inequalities in support caused by unevenness in the surfaces to be trued.

With the rails withdrawn, and the weight of the car resting on the blocking rollers and the drive rollers 187, the cutters are brought close to the wheels. The centering devices 18 are adjusted on the posts 22 to engage the projections 20 in the axle centers. After properly locating the cutters, they are fed into the wheel by lowering the center projections to transfer a part of the machine weight to car axle 26. Users of the commercial embodiment of the patented device are cautioned not to take too deep a cut. As a practical matter, it may be necessary to take as many as five cuts around the wheel.

The supporting structure or device 36 comprises an elongated, upstanding jack type device 40 having a guide 42 suitably ground supported and preferably anchored to the floor of the pit 14 as by bolts 43 or the like. The guide 42 is of substantial height and has a reduced neck portion 44 adjacent the upper end portion thereof.

The jack type device 40 further includes a jack 46 that is preferably fluid actuated for longitudinal or generally vertical movement of its piston rod 56 within the guide 42. There is also provided an elongnated, longitudinally or generally vertically movable rigid piston extension member 50 that is separate from the piston rod 56 but movable therewith and is guided witihin the reduced neck portion 44 of the guide 42. The arrangement thus far described facilitates in the assembly of the wheel truing mechanism 10 relative to the jack type device 40 and also enables the jack type device 40 to be easily replaced without the necessity of dismantling the frame structure 12 from the connecting means 42 to be described in more detail hereinafter, which connects the frame structure 12 to the supporting structure 36. It is to be understood that if desired, the jack 46 and the piston extension member 50 may be formed integral and as a unitary structure.

As illustrated, the jack 46 has a cylinder 54 that is of substantial length in order to prevent wobbling or lateral tipping of the upwardly projecting piston rod 56 and the piston extension member 50 relative to the ground supported guide 42. The upper portion of the piston rod 56 terminates in an enlarged head portion 58 that supports and engages the lower end portion 60 of the piston extension member 50 with the piston extension member 50 extending upwardly therefrom and passing through the reduced neck portion 44 with the piston extension member 50 projecting upwardly from the guide 42 and terminating with the upper end portion 62 of the piston extension member 50 being vertically spaced above the jack type device 40.

As illustrated in FIGS. 1 and 2, it is to be noted that there is a large cylindrical area of sliding contact along the longitudinal outer surface of the piston extension member 50 and the inner surface of the reduced neck portion 44 so that the piston extension member 50 and the piston rod 56 will be maintained in axial alignment. The base of the cylinder 54 is preferably secured within the lower framework of the guide 42 in any convenient manner as by means of the bolts 55. The co-operation of the cylindrical area of sliding contact between the piston extension member 50 and the reduced neck portion 44 assures that the wheel truing mechanism 10 will be maintained in the desired position to enable the cutter tools to accurately cut the respective tread surfaces of the wheels 24 during the cutting-truing operation.

A circular disc or collar member 64 is rigidly attached in any convenient manner as by welding or the like to the upper end portion 62 of the piston extension member 50. Resting on the upper portion of the collar member 64 and securely attached thereto by threaded bolts or the like 65 is a generally horizontally disposed, rigid, rectangular bearing plate 66 which projects generally laterally outwardly from the piston extension member 50 with the plate 66 being in spaced relationship below the portions of the U-shaped frame structure 12 which are immediately adjacent thereto.

Secured to the upper surface of the bearing plate 66 is a smaller plate 68 on which bears a pair of laterally spaced, upstanding lower bearing blocks 70—70. Threaded bolts 72 or the like securely and firmly attach the bearing blocks 70—70 and the smaller plate 68 to the bearing plate 66. The smaller plate 68 serves to distribute a load from the bearing blocks 70—70 onto the bearing plate 66. A pair of laterally spaced, upstanding upper bearing blocks 74—74 are supported by a plate 76 which in turn rests on a channel-shaped member 78 forming part of the U-shaped frame structure 12. It is to be noted that the upper bearing blocks 74—74 are vertically spaced upwardly from and in alignment with the lower bearing blocks 70—70 and that the bearing blocks 70—70 and 74—74 have their axes disposed at right angles to each other.

The connecting means 52 includes an elongated, generally vertically disposed, rigid link-like connecting member 80 which extends between the upper bearing blocks 74—74 of the U-shaped frame structure 12 and the bearing blocks 70—70 of the supporting structure 36. First pivot means 82, including an upper elongated pivot pin 84 that passes through an opening in the upper end portion 86 of the connecting member 80 and having the end portions thereof journalled in the upper bearing blocks 74—74, enables the U-shaped frame structure 12 to pivot relative to the connecting member 80 and the supporting structure 36 about a first generally horizontally disposed pivot axis A—A. Second pivot means 88, including a lower elongated pivot pin 90 that passes through an opening in the lower end portion 92 of the connecting member 80 and having the end portions thereof journalled in the bearing blocks 70—70, enables the U-shaped frame structure 12 and the connecting member 80 to pivot relative to the support structure 36 about a second generally horizontally disposed pivot axis B—B. It is to be noted that the longitudinal axes of the pivot pins 82 and 90 and the pivot axes A—A and B—B, respectively, each extend substantially normal relative to each other.

It is believed to be evident that the pivot means 82 and 88 in effect define a double articulated or universal connecting means which enables the U-shaped frame structure 12 to pivot substantially freely about the pivot axes A—A and B—B.

In view of the irregularities in each wheel 24 to be trued and their possible irregularities, one with respect to the other, it is apparent that the same set of forces will not prevail between the frame structure 12 by way of centering devices 18 and wheels 24 and drive rolls 187, throughout a complete operating cycle. To afford a compensating bias, I provide a stabilizing means within the apparatus.

The stabilizing means 38 is interposed in the space between the bearing plate 66 of the supporting structure 36 and a pair of generally parallel bearing bars 94 which are carried along the opposed side portions of the channel-shaped member 78. The bearing bars 94 as shown are positioned transversely of the U-shaped frame structure 12 with the stabilizing means 38 including a plurality of devices 96 that are substantially equally laterally outwardly spaced from the piston extension member 50. Each of the devices 96 is preferably located between a corner portion of the bearing plate 66 and an end portion of a bearing bar 94.

As illustrated in more detail in FIGURES 3 and 4, each of the stabilizing and cushioning devices 96 includes spaced apart, generally vertically disposed plates 98—98 which depend from the bearing plate 66. The plates 98—98 are each provided with openings in which there is journalled a generally horizontally extending pivot pin portion 100 of a swivel block member 102. An upwardly opening recess 104 is provided in the upper face of each swivel block member 102 and each of the bars 94 is provided with a downwardly opening recess 106 that is vertically aligned with the recess 104 in the corresponding swivel block member 102. Resilient biasing means 108, preferably in the form of a coil spring as illustrated, is positioned with the opposed end portions thereof being received in the recesses 104 and 106 so that the biasing means 108 will normally bias the U-shaped frame structure 12 against the above described pivotal movement about the axes A—A and B—B.

Generally vertically disposed, elongated pins 110 pass through aligned openings in the bearing bars 94, bearing plate 66 and a corresponding swivel block member 102 with each pin 110 being within the confines of a coil spring biasing means 108 and with each coil spring biasing means 108 also passing through an opening in the bearing plate 66. Each of the pins 110 has an enlarged head portion 112 which is preferably semi-circular in configuration and co-operates with a semi-circular recess 114 in the upper surface of the corresponding bearing bar 94 to define a movable joint arrangement that enables substantially free swiveling movement therebetween. If desired, the lower end portions 16 of each pin 110 may be provided with some type of securing means so that the pins 110 may be removably secured within the openings in the bearing bars 94, bearing plate 66 and block members 102.

It is to be understood that the bearing blocks 70—70 and 74—74; pivot pins 84, 90; connecting member 80 and supporting structure 36 are of substantial and sufficient size and strength so as to carry safely the weight of the wheel truing mechanism 10 and that the resilient biasing means 108 is of sufficient size and strength to normally bias the U-shaped frame structure 12 against the pivotal movement about the axes A—A and B—B.

In operation, a supply of fluid under pressure, not illustrated, may be introduced into or exhausted from the cylinder 54 to enable the jack type device 40 to be extended or retracted, respectively, and to effectively raise or lower the wheel truing mechanism 10 out of or into the pit 14 so that a railroad car may be positioned to enable the cutter tools to be brought into contact with the tread surfaces of the wheel 24 during the cutting-truing operation of the wheel truing mechanism. As pointed out above, in the cutting-truing operation, there will be unequal forces set up in the system transmitted to the U-shaped frame structure 12. Heretofore it has been deemed expedient to minimize the effect of such irregularities by limiting the depth of cut so that completion of the operation was limited, not by the driving power of rollers 28, nor by the quality of the cutters but by the capacity of the system to operate acceptably under irregular load conditions. The pivot means 82 and 88 permit the U-shaped frame structure 12 to universally pivot generally longitudinally and/or transversely with the appropriate stabilizing devices 96 permitting part of the U-shaped frame structure 12 to compensate the irregularity. At the same time the resilient biasing means 108 will maintain a biasing force against pivotal movement of the associated part of the U-shaped frame structure 12 so that when the cutting tool has removed the excessive amount of material from the wheel 24, the U-shaped frame 12 will be repositioned to its normal cutting-truing operative position by a force created by the biasing means 108 which has been compressed by reason of the excessive force on the cutter tool. Similarly, it is to be noted that the normal biasing effect of the biasing means 108 will effectively stabilize the apparatus assuring firm contact of the operating parts.

The pivotal movements of the U-shaped frame structure 12 during the cutting-truing operation are very slight, however, and do not have a substantial effect on the amount of the tread surface which is cut. Were it not for the biasing means 108 in stabilizing device 38, the unequal forces created in the entire structure each time that the cutter tools engaged a substantial amount of material on the tread surface of the wheels 24 would create heavy rocking and chattering. The stabilizing device 38, however, reduces such undesirable rocking and jerking motions or completely eliminate them and the cutting-truing operation will therefore continue smoothly. By reducing rocking and jerking motions in the U-shaped frame structure 12 a smooth cut can be made in the tread surface of the wheel 24 and maintenance of the wheel truing mechanism 10 will be minimized and its useful service life prolonged.

In this same regard, in order to prevent rocking and chattering of the truing mechanism, the jack type device 40 should present a rigid and sturdy support for the U-shaped frame structure 12. For example, if in a typical installation it is only necessary that the U-shaped frame structure 12 be raised or lowered fifteen inches, it has been determined that the jack type device 40 should have a cylinder that is approximately thirty inches in height with the piston being approximately twelve to fourteen inches in diameter so that in the extended position the piston rod may project approximately fifteen inches into and away from the cylinder. Further, the pivot pins 84 and 90 may be approximately eight to ten inches in diameter, with the pivot pins 110 being approximately one and one-half to two inches in diameter.

The jack type device 40 of the supporting structure 36 affords a simple and inexpensive means by which the wheel truing mechanism 10 may be raised and lowered out of and into the pit 14 and, in addition, gives the strength and rigidity which is desirable to maintain the wheel truing mechanism 10 in the desired operative position. The stabilizing elements introduced by my invention overcome a limitation to which this type of wheel truing mechanism has heretofore been subject and, as a result, make the mechanism more effective, reduce its maintenance and extend its service.

While the invention has been described in terms of an embodiment which it has assumed in practice, the scope of the invention should not be deemed to be limited by the precise embodiment herein shown, such other embodiments being intended to be reserved especially as they fall within the scope of the claims here appended.

I claim:

1. In a metallic wheel truing apparatus, the combination of a generally horizontally disposed, frame structure, cutter means movable relative to said frame structure adapted to cut a tread surface on a metallic wheel, support means movably supporting the frame structure for movement in a generally vertical direction to enable the cutter means to engage and disengage such tread surface during a cutting operation, said support means including an elongated, upstanding jack type device having a ground supported guide, a fluid operated jack mounted within said guide, a piston extension member actuated by said jack and projecting generally vertically upwardly beyond the guide, a plate member rigidly secured to the upper end portion of the piston extension member for movement therewith, said plate member being generally horizontally disposed below the frame structure in vertically spaced relationship thereto and extending generally laterally from said piston extension member, connecting means connecting the frame structure to the support means, said connecting means including a generally vertically disposed upwardly projecting elongated rigid member, first pivot means pivotally connecting the upper end portion of the rigid member to the frame structure to enable the frame structure to be pivotally movable relative to the rigid member and the support means about a first generally horizontally disposed pivot axis, second pivot means pivotally connecting the lower end portion of the rigid member to the one end portion of the piston extension member to enable the frame structure and the rigid member to be pivotally movable relative to the support means about a second generally horizontally disposed pivot axis that extends substantially normal to the said first pivot axis, and stabilizer means disposed in the space between the plate member and the frame structure for said stabilizer means including a plurality of elongated pivotally mounted pins extending between and connected to the plate member and the frame structure and a plurality of spring means interposed between the plate member and the frame structure for normally urging said frame struuture against said relative pivotal movement about said pivot axes.

2. In a metallic wheel truing apparatus, the combination of a frame structure, cutter means movable relative to said frame structure adapted to cut a tread surface on a metallic wheel, support means movably supporting the frame structure to enable the cutter means to engage and disengage such tread surface during a cutting operation, said support means including an elongated jack type device having a ground supported guide, a fluid operated jack mounted within said guide, a piston extension member actuated by said jack and projecting beyond the guide, a plate member rigidly secured to one end portion of the piston extension member for movement therewith, said plate member being disposed in spaced relationship to the frame structure, connecting means connecting the frame structure to the support means, said connecting means including an elongated rigid member, first pivot means pivotally connecting one end portion of the rigid member to the frame structure to enable the frame structure to be pivotally movable relative to the rigid member and the support means about a first pivot axis, second pivot means pivotally connecting the other end portion of the rigid member to the one end portion of the piston extension member to enable the frame structure and the rigid member to be pivotally movable relative to the support means about a second pivot axis that extends substantially normal to the first pivot axis, and stabilizer means disposed in the space between the plate member and the frame structure, said stabilizer means including a plurality of elongated pivotally mounted pins extending between and connected to the plate member and the frame structure and a plurality of resilient means interposed between the plate member and the frame structure for normally urging said frame structure against said relative pivotal movement about said pivot axes.

3. In a metallic wheel truing apparatus, the combination of a frame structure, cutter means movable relative to said frame structure adapted to cut a tread surface on a metallic wheel, support means movably supporting the frame structure to enable the cutter means to engage and disengage such tread surface during a cutting operation, said support means including an elongated jack type device having a ground supported guide, a fluid operated jack mounted within said guide, a piston extension member actuated by said jack and projecting beyond the guide, a plate member rigidly secured to one end portion of the piston extension member for movement therewith, said plate member being disposed in spaced relationship to the frame structure, connecting means connecting the frame structure to the support means, said connecting means including an elongated rigid member, first pivot means pivotally connecting one end portion of the rigid member to the frame structure to enable the frame structure to be pivotally movable relative to the rigid member and the support means about a first pivot axis, second pivot means pivotally connecting the other end portion of the rigid member to the one end portion of the piston extension member to enable the frame structure and the rigid member to be pivotally movable relative to the support means about a second pivot axis that extends substantially normal to the said first pivot axis, and stabilizer means disposed in the space between the plate member and the frame structure, said stabilizer means including resilient means interposed between the plate member and the frame structure for normally urging said frame structure against said relative pivotal movement about said pivot axes.

4. In a metallic wheel truing apparatus, the combination of a frame structure, cutter means movable relative to said frame structure adapted to cut a tread surface on a metallic wheel, support means movably supporting the frame structure to enable the cutter means to engage and disengage such tread surface during a cutting operation, said support means including an elongated jack type device having a ground supported guide, a fluid operated jack mounted within said guide, a piston extension member actuated by said jack and projecting generally vertically upwardly beyond the guide, a plate member rigidly secured to the one end portion of the piston extension member for movement therewith, said plate member being generally horizontally disposed below the frame structure in vertically spaced relationship thereto and extending generally laterally from said piston extension member, connecting means connecting the frame structure to the support means, first pivot means pivotally connecting the connecting means to the frame structure to enable the frame structure to be pivotally movable relative to the connecting means and the support means about a first pivot axis, second pivot means pivotally connecting the connecting means to the one end portion of the piston extension member to enable the frame structure and the connecting means to be pivotally movable relative to the support means about a second pivot axis that extends substantially normal to the said first pivot axis, and stabilizer means, said last named means including resilient means interposed between the plate member and the frame structure for normally urging said frame structure againt said relative pivotal movement about said axes.

5. In a metallic wheel truing apparatus, the combination of a generally horizontally disposed frame structure, cutter means movable relative to said frame structure adapted to cut a tread surface on a metallic wheel, support means movably supporting the frame structure for movement in a generally vertical direction to enable the cutter means to engage and disengage such tread surface during a cutting operation, said support means including an elongated, upstanding jack type device having a ground supported guide, a fluid operated jack mounted within said guide, a piston extension member actuated by said jack and projecting generally vertically upwardly beyond the guide, a plate member rigidly secured to the one end portion of the piston extension member for movement therewith, said plate member being generally horizontally disposed below the frame structure in vertically spaced relationship thereto and extending generally laterally from said piston extension member, connecting means connecting the frame structure to the support means, said connecting means including a generally vertically defined, upwardly projecting, elongated, rigid member, first pivot means pivotally connecting the upper end portion of the rigid member to the frame structure to enable the frame structure to be pivotally movable relative to the rigid member and the support means about a first generally horizontally disposed pivot axis, second pivot means pivotally connecting the lower end portion of the rigid member to the one end portion of the piston extension member to enable the frame structure and the rigid member to be pivotally movable relative to the support means about a second generally horizontally disposed pivot axis that extends substantially normal to the said first pivot axis, and stabilizer means disposed in the space between the plate member and the frame structure by normally urging said frame structure against said relative pivotal movement about said pivot axes.

6. In a metallic wheel truing apparatus, the combination of a frame structure, cutter means movable relative to said frame structure adapted to cut a tread surface on a metallic wheel, support means movably supporting the frame structure to enable the cutter means to engage and disengage such tread surface during a cutting operation, said support means including an elongated jack type device having a ground supported guide, a fluid operated jack mounted within said guide, a piston extension member actuated by said jack and projecting beyond the guide, connecting means connecting the frame structure to the support means, said connecting means including an elongated rigid member, first pivot means pivotally connecting one end portion of the rigid member to the frame structure to enable the frame structure to be pivotally movable relative to the rigid member and the support means about a first pivot axis, second pivot means pivotally connecting the other end portion of the rigid member to the one end portion of the piston extension member to enable the frame structure and the rigid member to be pivotally movable relative to the support means about a second pivot axis that extends substantially normal to the said first axis, and stabilizer means disposed between the frame structure and the support means, said latter means including a plurality of elongated pivotally mounted pins extending between and connected to the support means and the frame structure and a plurality of spring means interposed between the support means and the frame structure for normally urging said frame structure against said relative pivotal movement about said pivot axes.

7. In a metallic wheel truing apparatus, the combination of a rigid frame structure, cutter means movable relative to said frame structure adapted to cut a tread surface on a metallic wheel, support means movably supporting the frame structure to enable the cutter means to engage and disengage such tread surface during a cutting operation, connecting means connecting the frame structure to the support means, said connecting means including an elongated rigid member, first pivot means pivotally connecting one end portion of the rigid member to the frame structure to enable the frame structure to be pivotally movable relative to the rigid member and the support means about a first pivot axis, second pivot means pivotally connecting the other end portion of the rigid member to the support means to enable the frame structure and the rigid member to be pivotally movable relative to the support means about a second pivot axis that extends substantially normal to the said first pivot axis, and means disposed between the support means and the frame structure, said last named means including a plurality of elongated pivotally mounted pins extending between and connected to the support means and the frame structure and a plurality of resilient means interposed between the support means and the frame structure for normally urging said frame structure against said relative pivotal movement about said pivot axes.

8. In a metallic wheel truing apparatus, the combination of a frame structure, cutter means movable relative to said frame structure adapted to cut a tread surface on a metallic wheel, support means movably supporting the frame structure to enable the cutter means to engage and disengage such tread surface during a cutting operation, connecting means connecting the frame structure to the support means, first pivot means pivotally connecting the connecting means to the frame structure to enable the frame structure to be pivotally movable relative to the connecting means and the support means about a first pivot axis, second pivot means pivotally connecting the connecting means to the support means to enable the frame structure and the connecting means to be pivotally movable relative to the support means about a second pivot axis that extends substantially normal to the said first pivot axis, and stabilizer means, said last named means including means interposed between the support means and the frame structure for normally urging said frame structure against said relative pivotal movement about said pivot axes.

9. In a wheel truing apparatus, the combination of frame means, cutter means movable relative to said frame means for cutting a tread surface of a wheel, support means for supporting said frame means, and means interposed between the frame means and the support means for overcoming unequal and abrupt movements which may be created in the apparatus during a cutting operation in cutting such tread surface, said means including connecting means connecting the frame means to the support means, said connecting means including a pivot linkage device pivotally connecting the frame means to the support means to enable pivotal movement of the frame means about pivot axes that extend generally laterally and transversely relative to the frame means, a plurality of elongated pins pivotally connected between the frame means and the support means, and a plurality of resilient means interposed between and in bearing engagement with the frame means and the support means normally biasing said frame means against said pivotal movement.

10. In a wheel truing apparatus, the combination of frame means, cutter means movable relative to said frame means for cutting a tread surface of a wheel, support means for supporting said frame means, and means interposed between the frame means and the support means for overcoming unequal and abrupt movements which may be created in the apparatus during a cutting operation in cutting such tread surface, said means including connecting means connecting the frame means to the support means, said connecting means including a pivot linkage device pivotally connecting the frame means to the support means to enable pivotal movement of the frame means about pivot axes that extend generally laterally and transversely relative to the frame means, and resilient means interposed between and in bearing engagement with the frame means and the support means normally biasing said frame means against said pivotal movement.

11. In a wheel truing apparatus, the combination of frame means, cutter means movable relative to said frame means for cutting a tread surface of a wheel, support means for supporting said frame means, and means interposed between the frame means and the support means for overcoming unequal and abrupt movements which may be created in the apparatus during a cutting operation in cutting such tread surface, said means including connecting means connecting the frame means to the support means, said connecting means including a pivot linkage device pivotally connecting the frame means to the support means to enable pivotal movement of the frame means about a plurality of pivot axes, a plurality of elongated pins pivotally connected between the frame means and the support means, and a plurality of resilient means interposed between and in bearing engagement with the frame means and the support means normally biasing the frame means against said pivotal movement.

12. In a wheel truing apparatus, the combination of frame means, cutter means movable relative to said frame means for cutting a tread surface of a wheel, support means for supporting said frame means, and means interposed between the frame means and the support means for overcoming unequal and abrupt movements which may be created in the apparatus during a cutting operation in cutting such tread surface, said means including connecting means connecting the frame means to the support means, said connecting means including a pivot linkage device pivotally connecting the frame means to the support means to enable pivotal movement of the frame means about a plurality of pivot axes, and resilient means interposed between and in bearing engagement with the frame means and the support means normally biasing said frame means against said pivotal movement.

13. In a wheel truing apparatus having a frame structure, cutter means movable relative to said frame structure for cutting a tread surface of a wheel and support means movably supporting said frame structure to enable said cutter means to engage and disengage such tread surface during a cutting operation, the improvement comprising, in combination with said frame structure, means for overcoming unequal and abrupt movements which may be created in the apparatus during said cutting operation, said means including a pivot linkage device pivotally connecting the frame structure to the support means to enable said frame structure to be substantially universally pivotally movable about axes that extend generally transversely and longitudinally relative to the frame structure, and resilient means interposed between and in bearing engagement with the frame structure and the support means for normally biasing the frame structure against such pivotal movement.

14. In a wheel truing apparatus having a frame structure, cutter means movable relative to said frame structure for cutting a tread surface of a wheel and support means movably supporting said frame structure to enable said cutter means to engage and disengage such tread surface during a cutting operation, the improvement comprising, in combination with said frame structure, means for overcoming unequal and abrupt movements which may be created in the apparatus during said cutting operation, said means including pivot means pivotally connecting the frame structure to the support means to enable pivotal movement of said frame structure about pivot axes that extend substantially normal to each other, and resilient means interposed between and in bearing engagement with the frame structure and the support means for normally biasing the frame structure against such pivotal movement.

References Cited in the file of this patent
UNITED STATES PATENTS

| | | |
|---|---|---|
| 2,622,374 | Stanley | Dec. 23, 1952 |
| 2,712,207 | Cochran | July 5, 1955 |